(12) United States Patent
Oshiro

(10) Patent No.: US 7,665,353 B2
(45) Date of Patent: Feb. 23, 2010

(54) MEANS FOR DETECTING LOSS OF PNEUMATIC PRESSURE IN TIRE AND DEVICE FOR THE PURPOSE

(75) Inventor: Yuji Oshiro, Kobe (JP)

(73) Assignee: Sumitomo Rubber Industries, Ltd, Kobe (JP)

( * ) Notice: Subject to any disclaimer, the term of this patent is extended or adjusted under 35 U.S.C. 154(b) by 959 days.

(21) Appl. No.: 11/313,680

(22) Filed: Dec. 22, 2005

(65) Prior Publication Data

US 2006/0142912 A1    Jun. 29, 2006

(30) Foreign Application Priority Data

Dec. 24, 2004    (JP)    ............... 2004-374461

(51) Int. Cl.
*G01M 7/00*    (2006.01)
(52) U.S. Cl. ............... 73/146; 701/29; 702/98
(58) Field of Classification Search ............. None
See application file for complete search history.

(56) References Cited

U.S. PATENT DOCUMENTS

| | | | | |
|---|---|---|---|---|
| 4,876,528 | A * | 10/1989 | Walker et al. | 340/442 |
| 5,604,307 | A * | 2/1997 | Iida et al. | 73/146.2 |
| 6,604,040 | B2 * | 8/2003 | Kawasaki et al. | 701/80 |
| 7,136,775 | B2 * | 11/2006 | Yanase | 702/140 |
| 7,301,444 | B2 * | 11/2007 | Matsuura | 340/442 |
| 7,363,189 | B2 * | 4/2008 | Yanase | 702/141 |
| 7,573,376 | B2 * | 8/2009 | Oshiro | 340/442 |

FOREIGN PATENT DOCUMENTS

| | | |
|---|---|---|
| JP | 9-188114 A | 7/1997 |
| JP | 11-78442 A | 3/1999 |
| JP | 2000-79812 A | 3/2000 |
| JP | 2002-19435 A | 1/2002 |
| JP | 2002-181669 A | 6/2002 |
| JP | 2002-211220 A | 7/2002 |

* cited by examiner

*Primary Examiner*—Lisa M Caputo
*Assistant Examiner*—Jermaine Jenkins
(74) *Attorney, Agent, or Firm*—Birch, Stewart, Kolasch & Birch, LLP

(57) ABSTRACT

An object of the present invention is to provide a device for detecting as to whether or not the heterogeneous tires are set on the right and left wheels, respectively, and accurately detecting the loss of the pneumatic pressure in the tire, even when heterogeneous tires are set on the right and the left wheels, respectively. This is a method for detecting as to whether or not the kinds of the tires set on a vehicle are different based on the rotational velocity of the wheels set on the vehicle, so that, when the pneumatic pressure of the tire set on said vehicle is normal, the velocity ratios of the right and left front wheels or the velocity ratios of the right and left rear wheels are obtained by each velocity region of the vehicle as described above, and comparison is made between the wheel velocity ratios of the right and left front wheels by each velocity region or between the wheel velocity ratios of the right and left rear wheels by each velocity region, thereby detecting that the heterogeneous tires are set between the right and left sides. Furthermore, the method for detecting loss of the pneumatic pressures of tires according to the present invention is designed to modify the threshold value for judging loss of the pneumatic pressures of the tires based on the results detected by the method for detecting the heterogeneous tires as described above.

5 Claims, 5 Drawing Sheets

MEANS FOR DETECTING LOSS OF PNEUMATIC PRESSURE IN TIRE AND DEVICE FOR THE PURPOSE

BACKGROUND OF THE INVENTION

The present invention relates to a device and a method for detecting loss of pneumatic pressures in the tires set on a vehicle. More particularly, the invention relates to a device and a method for accurately detecting loss of pneumatic pressures in the tires by detecting that the kinds of the tires set on a vehicle are different.

When pneumatic pressure of the tires set on a vehicle is lowered, fuel cost is aggravated, and danger for bursting is invited in high velocity running. Conventionally, loss of pneumatic pressure of tire is detected by utilizing the change in the characteristics of the tire such as decrease in the dynamic loaded radius of the tire or variation in the resonance frequency resulting from the loss of pressure.

For example, conventional device for detecting loss of pneumatic pressure in tire utilizes a principle that when a specified tire of a certain vehicle shows loss of pressure, the outer diameter (dynamic loaded radius of tire) of such tire decreases more than that of the tire having normal internal pressure, so that its rotational angular velocity shows increase more than that of the other normal type. For example, according to the method of detecting loss of internal pressure from the comparative differences in the rotational angular velocity, the following expression is used as an identification value (Japanese Unexamined Patent Publication No. 63-305011):

$$DEL=\{(F1+F4)/2-(F2+F3)/2\}/\{(F1+F2+F3+F4)/4\} \times 100 \, (\%)$$

wherein F1 to F4 denote the rotational angular velocities of front left tire, front right tire, rear left tire and rear right tire, respectively.

However, in case of the difference in the kinds of the set tires, no accurate detection of the pneumatic pressure of the tire can be expected.

To meet the situation, there have been proposed the methods for finding abrasion of the tire and identifying the kind of the tire.

The invention of Japanese Unexamined Patent Publication No. 9-188114 discloses a method for identifying whether the kind of the tires set on the vehicle is, for example, the summer use or winter use, by comparing the inclination of a straight line at the time of plotting the ratio between the rotational velocity of the front wheel and the rotational velocity of the rear wheel to the vehicle velocity with the previously calibrated data of the tires of the known kinds.

The invention of Japanese Unexamined Patent Publication No. 11-78442 uses a relationship of the ratio between the rotational velocity of the front wheels and the rotational velocity of the rear wheels with the acceleration rate of the vehicle, so as to detect the abrasive condition of the tire.

The invention of Japanese Unexamined Patent Publication No. 2000-79812 discloses a method for identifying whether the tires set on the driving shaft are for summer use or for winter use by utilizing the inverse of the rotary radius by using the tire pressure decrease identification value (DEL), but said method is limited to the application to a vehicle furnished with LSD (Limited slip differential).

Japanese Unexamined Patent Publication No. 2002-19435 Publication and Japanese Unexamined Patent No. 2002-181669 use the relationship between the slip ratio (a value obtained by dividing the difference between the rotational velocity of the following wheel and the rotational velocity of the driving wheel by the rotational velocity of the driving wheel) so as to identify the kind of the tire.

Japanese Unexamined Patent Publication No. 2002-211220 discloses a method for identifying the kind of the tire by the size of spreading of the identification values of pressure decrease of tire (average of the absolute values of the identification values of pressure decrease of tire).

Besides, there is a method for changing the tire identification method in the case where the wheels have different rotational characteristics due to the difference of the tire characteristics on computation of the standard values from the angular velocity of the wheels based on each velocity interval of vehicles (German PAO 10300330 Specification No. 10300330).

In the case where the different kinds of tires are used depending on the position of setting on the vehicle, especially when the kinds of the tires set on each of the right and left driving wheels are different, decrease in the tire pressures cannot accurately be identified with the threshold value for identifying the pressure decrease of tires having the same kind of tires set. Furthermore, when the kinds of the tires set on the respective ones of the right and left driving wheels are different, because of the difference of the driving characteristics between the right and the left sides, problems occur such that slips occur and brake operations do not work smoothly to cause elongation of the brake distance, and so on. Consequently, it becomes necessary to give warning to the driver that the kinds of the tires are different between the right and left driving wheels respectively, or to make the wheel control device (such as ABS, TRC) operative to meet the different kinds of the tires.

SUMMARY OF THE INVENTION

Conventionally, it has been possible to identify the case of the tire having been worn out, or whether the tires set at present are those for use in winter or they are those for use in summer, but it has not been possible to know the heterogeneity of tires when the heterogeneous tires are set respectively on the right and left driving wheels of a vehicle.

An object of the present invention is to provide a device for accurately detecting whether or not the heterogeneous tires are set on the right and left wheels, respectively, without being limited by the condition of the road surface, or by the construction of the vehicle such as an LSD being furnished.

Another object of the present invention is to provide a device for accurately detecting the loss of the pneumatic pressure in the tire, even when the heterogeneous tires are set on the right and the left wheels, respectively.

In the present invention, the term wheel velocity depicts a product of a rotational angular velocity of a wheel by a given tire radius.

The present invention relates to a method for detecting whether kinds of tires provided on a vehicle are different or not based on a rotational velocity of wheels set on said vehicle, said method comprising steps of: calculating velocity ratios of right and left front wheels or velocity ratios of right and left rear wheels at each of velocity regions, when pneumatic pressures of said tires provided on said vehicles are normal; comparing said velocity ratio of said right front wheel with said velocity ratio of said left front wheel at each of said velocity regions, or comparing said velocity ratio of said right rear wheel with said velocity ratio of said left rear wheel at each of said velocity regions; and detecting a heterogeneity between said tires provided on said right front wheel and said left front wheel, or a heterogeneity between said tires provided on said right rear wheel and said left rear wheel.

And the present invention relates to a method for detecting a loss of pneumatic pressures of tires comprising a step of modifying a threshold value for deciding the loss of pneumatic pressure of the tires as a result of the step of detecting a heterogeneity between said tires provided on said right front wheel and said left front wheel, or a heterogeneity between said tires provided on said right rear wheel and said left rear wheel by the method as defined above.

And the present invention relates to a device for detecting whether kinds of tires provided on a vehicle are different or not based on a rotational velocity of wheels set on said vehicle, said device comprising; a wheel velocity calculating means for calculating each rotational velocity of a right front wheel and a left front wheel as well as a right rear wheel and a left rear wheel which are set on a vehicle at each of velocity regions, when pneumatic pressures of said tires provided on said vehicles are normal; a wheel velocity ratio comparison means for comparing velocity ratios between the rotational velocities of said right front wheel and said left front wheel which are calculated at each of said velocity regions, or velocity ratios between the rotational velocities of said right rear wheel and said left rear wheel which are calculated at each of said velocity regions; and a detection means for detecting a heterogeneity between said tires provided on said right front wheel and said left front wheel, or a heterogeneity between said tires provided on said right rear wheel and said left rear wheel based on as a result of comparing the velocity ratios between the rotational velocities of said right front wheel and said left front wheel, or the velocity ratios between the rotational velocities of said right rear wheel and said left rear wheel.

And the present invention relates to a device for detecting a loss of pneumatic pressures of tires comprising a means for modifying a threshold value for deciding the loss of pneumatic pressure of the tires as a result of a detection means for detecting a heterogeneity between said tires provided on said right front wheel and said left front wheel, or a heterogeneity between said tires provided on said right rear wheel and said left rear wheel by the device as defined above.

And the present invention relates to a program for implementing a computer as a means for detecting whether kinds tires provided on a vehicle are different or not based on a rotational velocity of wheels set on said vehicle, said means comprising; a wheel velocity calculating means for calculating each rotational velocity of a right front wheel and a left front wheel as well as a right rear wheel and a left rear wheel which are set on a vehicle at each of velocity regions, when pneumatic pressures of said tires provided on said vehicles are normal; a wheel velocity ratio comparison means for comparing velocity ratios between the rotational velocities of said right front wheel and said left front wheel which are calculated at each of said velocity regions, or velocity ratios between the rotational velocities of said right rear wheel and said left rear wheel which are calculated at each of said velocity regions; and a detection means for detecting a heterogeneity between said tires provided on said right front wheel and said left front wheel, or a heterogeneity between said tires provided on said right rear wheel and said left rear wheel based on as a result of comparing the velocity ratios between the rotational velocities of said right front wheel and said left front wheel, or the velocity ratios between the rotational velocities of said right rear wheel and said left rear wheel.

The velocity region of a vehicle as described above may include the case of the vehicle velocity being zero, i.e., the case where the vehicle is stopped, as a velocity region. The wheel velocity ratio of the right and left front wheels is left side front wheel velocity/right side front wheel velocity, or right side front wheel velocity/left side front wheel velocity. The wheel velocity ratio of the right and left rear wheels is left side rear wheel velocity/right side rear wheel velocity, or right side rear wheel velocity/left side rear wheel velocity.

Furthermore, without making comparison of the velocity ratios between the right and left front wheels or of the velocity ratios between the right and left rear wheels on each velocity region obtained at the time of the normal internal pressures, the velocity ratios between the right and left front wheels or the velocity ratios between the right and left rear wheels obtained at the time of the normal internal pressures may be compared with an absolute value, e.g., zero, so as to judge that the heterogeneous tires are set between the right and left sides when the difference between the right and left vehicle velocity ratio and zero exceeds a certain threshold value.

As a wheel velocity ratio by the velocity region of a vehicle as described above, in place of the vehicle velocity ratio between the right and left front wheels or the vehicle velocity ratio between the right and left rear wheels, the following expression may be adopted:

((wheel velocity of left side front wheels+wheel velocity of right side rear wheels)−(wheel velocity of right side front wheels+wheel velocity of left side rear wheels)/total of the wheel velocities of four wheels)×200.

Alternatively, as a wheel velocity ratio by the velocity region of a vehicle as described above, in place of the vehicle velocity ratio between the right and left front wheels or the vehicle velocity ratio between the right and left rear wheels, the following expression may be adopted:

((wheel velocity of left side front wheels+wheel velocity of right side rear wheels)/(wheel velocity of right side front wheels+wheel velocity of left side rear wheels)−1)×100.

Furthermore, as a wheel velocity ratio by the velocity region of a vehicle as described above, in place of the vehicle velocity ratio between the right and left front wheels or the vehicle velocity ratio between the right and left rear wheels, the following expression may be adopted:

wheel velocity of left side front wheels+wheel velocity of right side rear wheels)/(wheel velocity of right side front wheels+wheel velocity of left side rear wheels)−1.

Furthermore, without making comparison on each velocity region of a vehicle, these different wheel velocity ratios may be compared with an absolute value, e.g., zero, and when the difference between the wheel velocity ratio and zero exceeds a certain threshold value judgment may be made so that the heterogeneous tires are set on the subjective wheels.

According to the heterogeneous tire detection device of the present invention, the driver may be warned that the heterogeneous tires are set on each of the right and left wheels and urged to replace the tires. Furthermore, according to the tire pneumatic pressure loss detection device of the present invention, even in the case where the heterogeneous tires are set on each of the right and left wheels, pressure loss of the tire can be accurately detected by setting to the tire pressure loss identification threshold value in the case of the setting of heterogeneous tires. By this procedure, even in the case where the heterogeneous tires are set on each of the right and left wheels, the driver can be accurately warned that the tire pressures are lowered. Referring to the example to be described later, in an example of using an FR car of Mercedes Benz E Class made by Daimler Chrysler. sets with the summer tires and winter tires of the sizes of 205/60R16, in the case of the same kind tires are set on each of the right and left wheels, the comparative values of the right and left wheel velocity ratios in each vehicle velocity region do not exceed the threshold value. However, in the case of the heterogeneous tires being set, there may be cases that the comparative values of the right and left wheel velocity ratios on each vehicle velocity region exceed the threshold value, thus permitting to identify the heterogeneous tires being set.

According to the present invention, as it is possible to detect accurately that the heterogeneous tires are set, in the case where the heterogeneous tires are set, the related information may be used for ABS (antilock brake system) or TRC (traction control) devices to effect the optimum controls proportionate to the kinds of the tires different in each of the right and left wheels.

For example, in ABS device, the differences of the kinds of the tires in each of the right and left wheels may be inputted from the heterogeneous tire detection device of the present invention to set the distribution of the brake operating forces of the respective wheels according to the kind of the tire. The ABS device is to detect the timely slipping (tire locking) to regulate the brake operating force in real time, wherein by setting the brake operating force by wheel according to the kind of the tire, it becomes possible to obtain the maximum brake force immediately before the locking of each wheel to realize more safe and secure brake operation. As a result, even in case of the difference of the kinds of the tires in each of the right and left wheels, the driver can effect brake operation under the condition possible to make direction control.

In the TRC device, the differences of the kinds of the tires in the respective right and left wheels may be inputted from the heterogeneous tire detection device of the present invention to regulate for example the driving force distribution of the right and left wheels, or to set the upper limit of the driving force proportionate to the kind of the tire to prevent slipping at the start and acceleration, thereby realizing the more effective drive control of vehicle.

According to the heterogeneous tire detection device of the present invention, without depending on the condition of road surface, and even without the LSD setting on the vehicle, it is possible to detect accurately that the heterogeneous tires are set in each of the right and left wheels.

Also, according to the tire pneumatic pressure loss detection device of the present invention, even in case of the heterogeneous tires being set, by setting to the tire pressure loss threshold value in the case of the heterogeneous tire setting, loss of tire pressure can be accurately detected.

DETAILED DESCRIPTION

Embodiment

Hereinafter, based on the appended drawings, description will be given on the heterogeneous tire detection device of the present invention, along with the tire pneumatic pressure loss detection method and device using said device.

Figure 1:
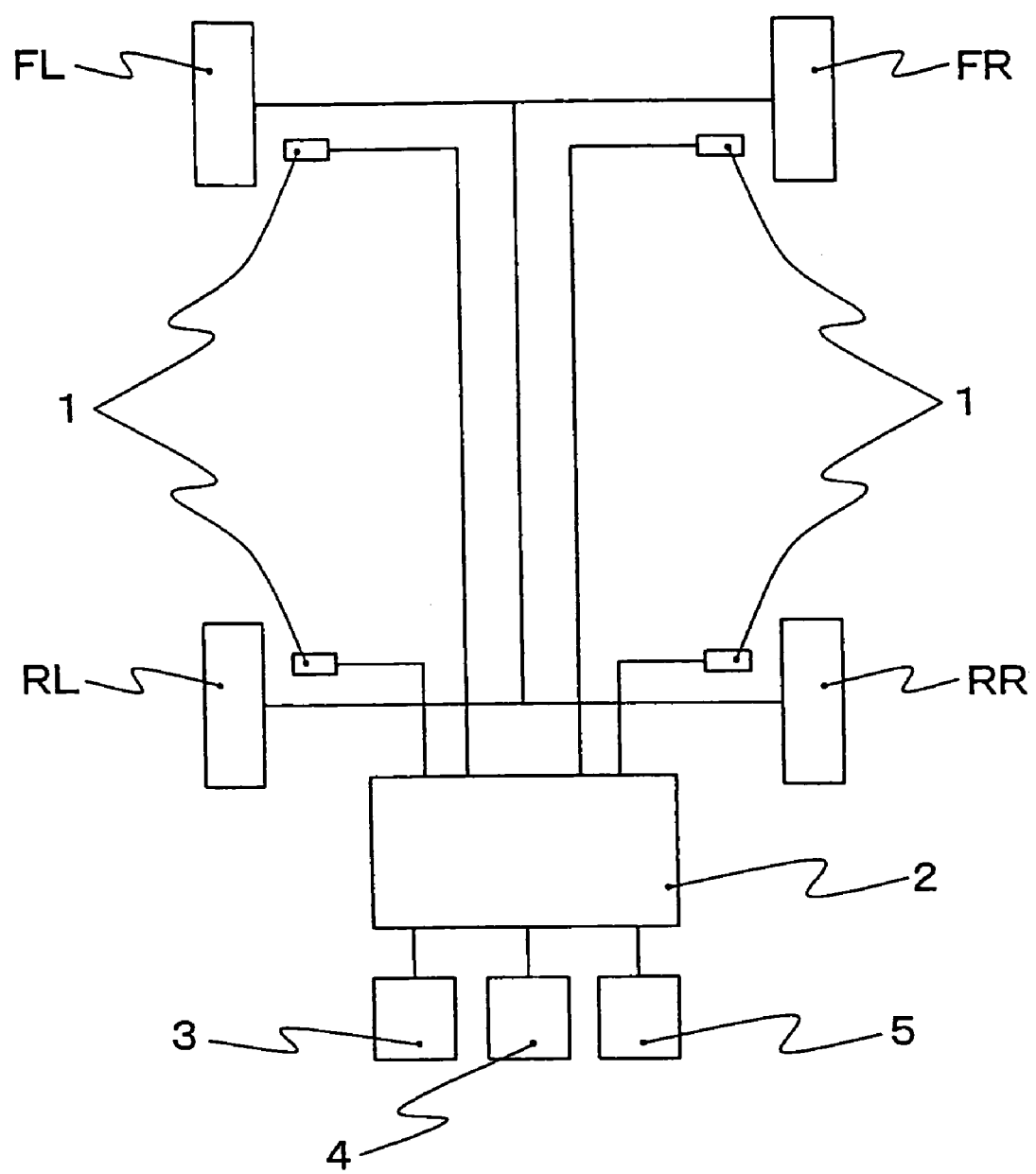
FIG. 1 is a block diagram showing a device for detecting loss of pneumatic pressure of the tire relating to an embodiment of the present invention.

As shown in FIG. 1, the tire pneumatic pressure loss detection device according to an embodiment of the present invention is to detect whether or not the pneumatic pressures of four tires FL, FR, RL and RR provided on the vehicle are lowered, being furnished with the ordinary wheel velocity detection means 1 provided in connection with the tires, respectively.

As a wheel velocity detection means 1, there may be used an angular velocity sensor including a wheel velocity sensor number of pulses by generating the rotary pulses using an electromagnetic pickup or the like, or a dynamo which effects electric generation and for measuring the rotational angular velocity and wheel velocity from the generated voltage. The output of the wheel velocity detection means 1 is given to the control unit 2 which is a computer such as ABS. The control unit 2 is connected with a display 3 which is constituted by a liquid crystal display element, plasma display element or CRT for informing the tire whose pneumatic pressure has been lowered, an initializing switch 4 which can be operated by a driver, and an alarm 5.

Figure 2:
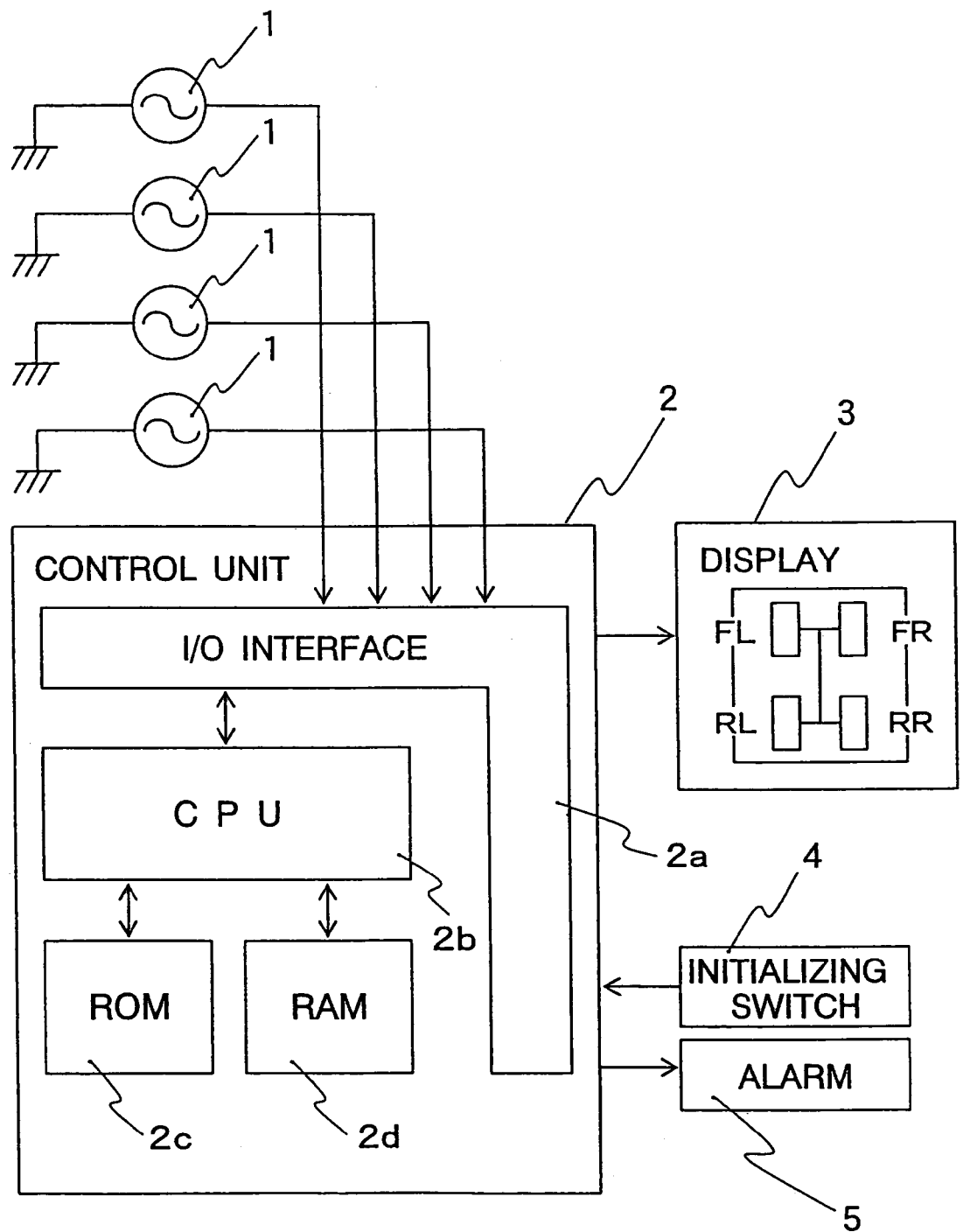
FIG. 2 is a block diagram showing an electrical constitution of the device for detecting the loss of the pneumatic pressure of the tire of FIG. 1.

The control unit 2 referred to above is constituted, as shown in FIG. 2, by an I/O interface 2$a$ which is necessary for the reception and delivery of signals with the external device, a CPU 2$b$ which functions as a nucleus for operation processing, a ROM 2$c$ housing the control motion program of said CPU 2$b$, and a RAM 2$d$ in which the data and the like are temporarily written at the time of the control motion of said CPU 2$b$ or from which the written data and the like are read out.

In the wheel velocity detection means 1 referred to above, pulse signals coordinate with the revolution of the tire (hereinafter to be referred to as the wheel velocity pulse) are outputted. In the CPU 2$b$, based on the wheel velocity pulse outputted from the wheel velocity detection means 1, the predetermined sampling cycle $\Delta T$ (sec), e.g., $\Delta T=1$ sec., so that every 1 second the rotational angular velocity Fi of each tire is computed. And, based on the rotational angular velocity Fi, the wheel velocity Vi of the tire of each wheel is computed. And, based on the rotational angular velocity Fi, the wheel velocity Vi of each wheel is computed. Herein, V1 denotes a wheel velocity of a front left tire, V2 that of a front right tire, and V3 that of a rear left tire and V4 that of a rear right tire.

In the present embodiment, the wheel velocity ratio of the right and left front wheels is V1/V2 (or V2/V1), and the wheel velocity ratio of the right and left rear wheels is V3/V4 (or V4/V3).

Also, the right and left wheel velocity ratio of the front wheels in the wheel velocity region i is represented by FACHiF, and, the right and left wheel velocity ratio of the rear wheels in the wheel velocity region i is represented by FACHiR. And, in the present embodiment, the right and left wheel velocity ratio of the front wheels in the wheel velocity region i and the right and left wheel velocity ratio of the front wheels in the wheel velocity region j are compared by the size of the absolute value |FACHiF−FACHjF|. Further, the right and left wheel velocity ratio of the rear wheels in the vehicle velocity region i and the right and left wheel velocity ratio of the front wheels in the vehicle velocity region j are compared by the size of the absolute value |FACHiR−FACHjR|. For example, the comparison in the case between the right and left wheel velocity ratio of the rear wheels in the fifth velocity region and the right and left wheel velocity ratio of the rear wheels in the sixth velocity region results in the absolute value |FACH5R−FACH6R|. In the present embodiment, all the widths of the vehicle velocity regions are assumed to be equal, but the width of the vehicle velocity region may differ by each velocity region.

The resulting comparative value (in the present embodiment, |FACHiF−FACHjF| or |FACHiR−FACHjR|) is compared with the previously set threshold value, and when the result is larger than the threshold value, judgment is made that the heterogeneous wheels between the right and left sides are set. The threshold value is determined on each combination of the vehicle velocity regions to be compared (with i and j given above). In the case where all the widths of the vehicle velocity regions are equal, the threshold values in the comparison with the adjacent regions may be equalized. In other words, the threshold value in the comparison between the vehicle velocity region i and i+1 and the threshold value in the comparison between the vehicle velocity region j and j+1 may be set to the same values.

The threshold value is in practice determined by setting the different tires on the right and left sides out of the plural kinds of the tires assumable for application to the vehicle, and effecting the running test. For example, of the heterogeneous tires, a value smaller than the comparative value in the smallest combination of the comparative values, e.g., 80% of said comparative value, is taken as the threshold value. The extent of the small value allowable to be adopted is determined in consideration of the kinds of the vehicle and the tire and the number of samplings with the heterogeneous tire detection devices, error analysis, dispersion of data, etc. Besides, a plurality of threshold values may be set in the comparisons in combination of the same velocity regions through the combinations of different tires.

Furthermore, it is possible to detect that the tires having large degree of abrasion are set on either the right or the left side, by setting comparative values by applying the dangerous tires (about to give a slip sign) having heavy abrasion degree and the sound tires both of the same kind.

And, in case that a judgment has been made that the wheels different between the right and left sides are set, the threshold value for judging the loss of the tire pneumatic pressure is changed to the threshold value of the case where the heterogeneous tires are set. When a plurality of the heterogeneous tire detection threshold values are set, threshold values for judging the loss of pneumatic pressure of tire may be set according to the respective detective threshold values. When judgment has been made that the heterogeneous tires are set, a heterogeneous tire setting alarm may be displayed on the warning device to urge the driver to replace the tires.

The tire pneumatic pressure loss detection device according to the present embodiment is constituted by a wheel velocity detecting means, a memory means, a wheel velocity ratio operating means, a comparison means for comparing the right and left wheel velocity ratios on each vehicle velocity, a heterogeneous tire detecting means for detecting whether the heterogeneous tires are set or not based on the results of said comparison, and a threshold value changing means for judging the lowering of the tire pneumatic pressure and changing the threshold value. As to the comparison as described above, there may be used, for example, a method of comparing the difference or ratio with the predetermined threshold value.

The program for detecting the heterogeneous tires according to the present embodiment causes the control unit 2 as described above to function as a means for operating the wheel velocity ratio, means for memorizing the right and left wheel velocity ratios, comparison means for comparing between the right and left wheel velocity ratio of the front wheels or between the right and left wheel velocity ratio of the rear wheels in the unit of the velocity region obtained at the time of the normal internal pressure as described above, and detection means for detecting that the heterogeneous tires are set on the right and left sides based on the results of said comparison.

Furthermore, without making comparison of the wheel velocity ratios between the right and left front wheels or of the wheel velocity ratios between the right and left rear wheels on each velocity region obtained at the time of the normal internal pressures, the wheel velocity ratios between the right and left front wheels or the wheel velocity ratios between the right and left rear wheels obtained at the time of the normal internal pressures may be compared with an absolute value, e.g., zero, so as to judge that the heterogeneous tires are set between the right and left sides when the difference between the right and left vehicle velocity ratio and zero exceeds a certain threshold value.

In the present embodiment, as a wheel velocity ratio by each velocity region, the vehicle velocity ratio between the right and left front wheels or the vehicle velocity ratio between the right and left rear wheels has been adopted, but in place of the vehicle velocity ratio between the right and left front wheels or the vehicle velocity ratio between the right and left rear wheels, the following expression may be adopted:

((wheel velocity of left side front wheels+wheel velocity of right side rear wheels)−(wheel velocity of right side front wheels+wheel velocity of left side rear wheels)/total of the wheel velocities of four wheels)×200.

Alternatively, as a wheel velocity ratio by each velocity region of a vehicle as described above, in place of the vehicle velocity ratio between the right and left front wheels or the vehicle velocity ratio between the right and left rear wheels, the following expression may be adopted:

((wheel velocity of left side front wheels+wheel velocity of right side rear wheels)/(wheel velocity of right side front wheels+wheel velocity of left side rear wheels)−1)×100.

Furthermore, as a wheel velocity ratio by each velocity region of the vehicle as described above, in place of the wheel velocity ratio between the right and left front wheels or the wheel velocity ratio between the right and left rear wheels, the following expression may be adopted:

(wheel velocity of left side front wheels+wheel velocity of right side rear wheels)/(wheel velocity of right side front wheels+wheel velocity of left side rear wheels)−1.

With any wheel velocity ratio as described above, judgment can be made as to whether the heterogeneous tires are included in the wheels of the subject of comparison or not.

Furthermore, without making comparison on each velocity region of a vehicle, these different wheel velocity ratios may be compared with an absolute value, e.g., zero, and when the difference between the wheel velocity ratio and zero exceeds a certain threshold value judgment may be made that the heterogeneous tires are set on the subjective wheels.

Figure 3:
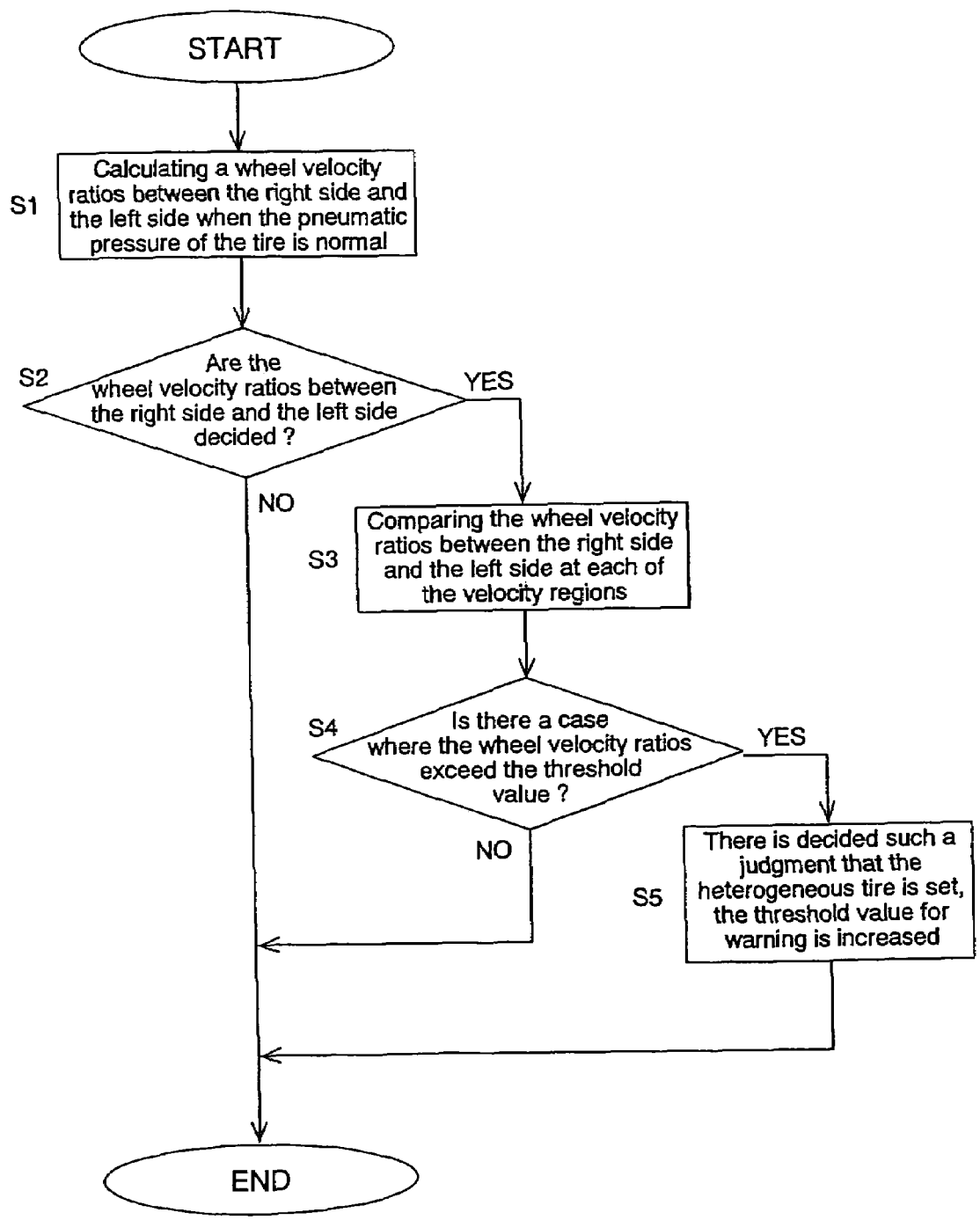
FIG. 3 is a flow chart relating to the embodiment.

Next, referring to FIG. 3, operations will be explained.

In Step S1, when the pneumatic pressure of the tire is normal, a data input order is sent to the input device to take the rotational velocity information of wheels into the memory. When the rotational velocity of each wheel is inputted, the velocity of the vehicle is computed as an average of the rotational velocities of the respective wheels. Here, the fact that the pneumatic pressure of the tire is normal is judged for example by the fact of the initializing switch 4 having been depressed. The driver is allowed to depress the initializing switch 4 to start the heterogeneous tire setting detection when the pneumatic pressure of tire is normal, e.g., when he has adjusted the pneumatic pressure of tire to the normal value. The initializing switch 4 is used for the case of detecting the heterogeneous tire and starting, and also for the case of correcting the tire pneumatic pressure loss judgment threshold value in conformity with the set tire. The rotational velocity of wheel is detected in an optional cycle, e.g., in a cycle of 1 second, and when the data of the computed vehicle velocity, right and left wheel velocity ratios of front wheel and right and left wheel velocity ratios of rear wheel memorize to a memory. When vehicle velocity, right and left wheel velocity ratios of front wheel and right and left wheel velocity ratios of rear wheel have been accumulated to a certain extent of numbers (Step S2), the right and left wheel velocity ratios on each velocity region are compared (Step S3). In the present embodiment, the accumulated right and left wheel velocity ratio data are classified by each region of the vehicle velocity and averaged by each vehicle velocity region. And, comparison is made between the averaged right and left wheel velocity ratios of different vehicle velocity regions. To average the data is to exclude the factors other than those of the heterogeneous tires. For example, depending on the case where the vehicle is accelerated, where it is running under inertia, or where deceleration is made by brake, the right and left wheel velocity ratios may become different, and while the vehicle is turning the wheel velocities differ between the right and left wheels. Also, the right and left wheels may sustain different effects or slip rates by irregularities of road surface.

Assuming the vehicle velocity region numbers to be i, j (i≠j), average value of right and left front wheel velocity ratio to be FACHiF or FACHjF, and average value of right and left rear wheel velocity ratio to be FACHiR or FACHjR, comparison is made by:

|FACHiF−FACHjF|(front wheel) or |FACHiR−FACHjR| (rear wheel).

When there is a case that the comparison of the right and left velocity ratios by each vehicle velocity region (|FACHiF−FACHjF| or |FACHiR−FACHjR|) exceeds the preset threshold value, judgment is made that the wheels different between the right side and the left side are set (Step S4).

When judgment has been made that the wheels are set to be different between the right side and the left side (branched to YES from Step S4), the threshold value for judgment of loss of pneumatic pressure of tire is changed to the threshold value for the case that the heterogeneous tire is set (Step S5). Here, it may be allowable simultaneously to display on a display 3 to the effect that the heterogeneous tires are set, or to issue an alarm from the alarm bell 5. Then, though not shown in FIG. 3, when neither of the comparative values of the right and left wheel velocity ratios is in excess of the threshold value, the threshold value for judging the loss of the pneumatic pressure of tire is set to the threshold value for the case of the same kind of tires.

Thus, it is possible to continue running under the condition of the heterogeneous tires being set, and to display the loss of pneumatic pressure accurately on a display unit 3 or to issue alarm from the alarm device 5. Conventionally, even in case of the heterogeneous tires being set, judgments had been made with the same judging threshold value for judging the loss of the pneumatic pressure of tire as that for the case of the same kind of tires, so that there were cases for the alarm signals to be issued at the time when the pneumatic pressure of tire was not lowered to a degree necessary to be alarmed. However, in the present invention, release of such erroneous alarm can be prevented.

In the mode of the present embodiment, the comparison of the right and left wheel velocity ratios by each vehicle velocity is to be made by the difference of them, but according to the present invention, the comparison is not limited to the difference of the wheel velocity ratio but the ratio of the wheel velocity ratio or the difference between the ratio of the wheel velocity ratio and 1 and the like may be used.

In the following example, description will be made on the case of using an FR car, but the present invention is not limited to the application to the FR car but is applicable similarly to FF car, MR car, and 4WD car.

EXAMPLE

In the example, Dunlop Falken Tyers Ltd.-made SP9000 (summer tire) and Continental-made Conti TS700 (winter tire), summer tires and winter tires having the sizes of 205/60R16, were used by setting on Mercedes Benz E-class car made by Daimler Chrysler. FR car. In the present example, tests were effected by two riders under the condition of normal tire pneumatic pressure by running on an ordinary road. As to the heterogeneous tires, summer tires and winter tires of the same size were set on the right and left wheels, respectively.

Figure 4:
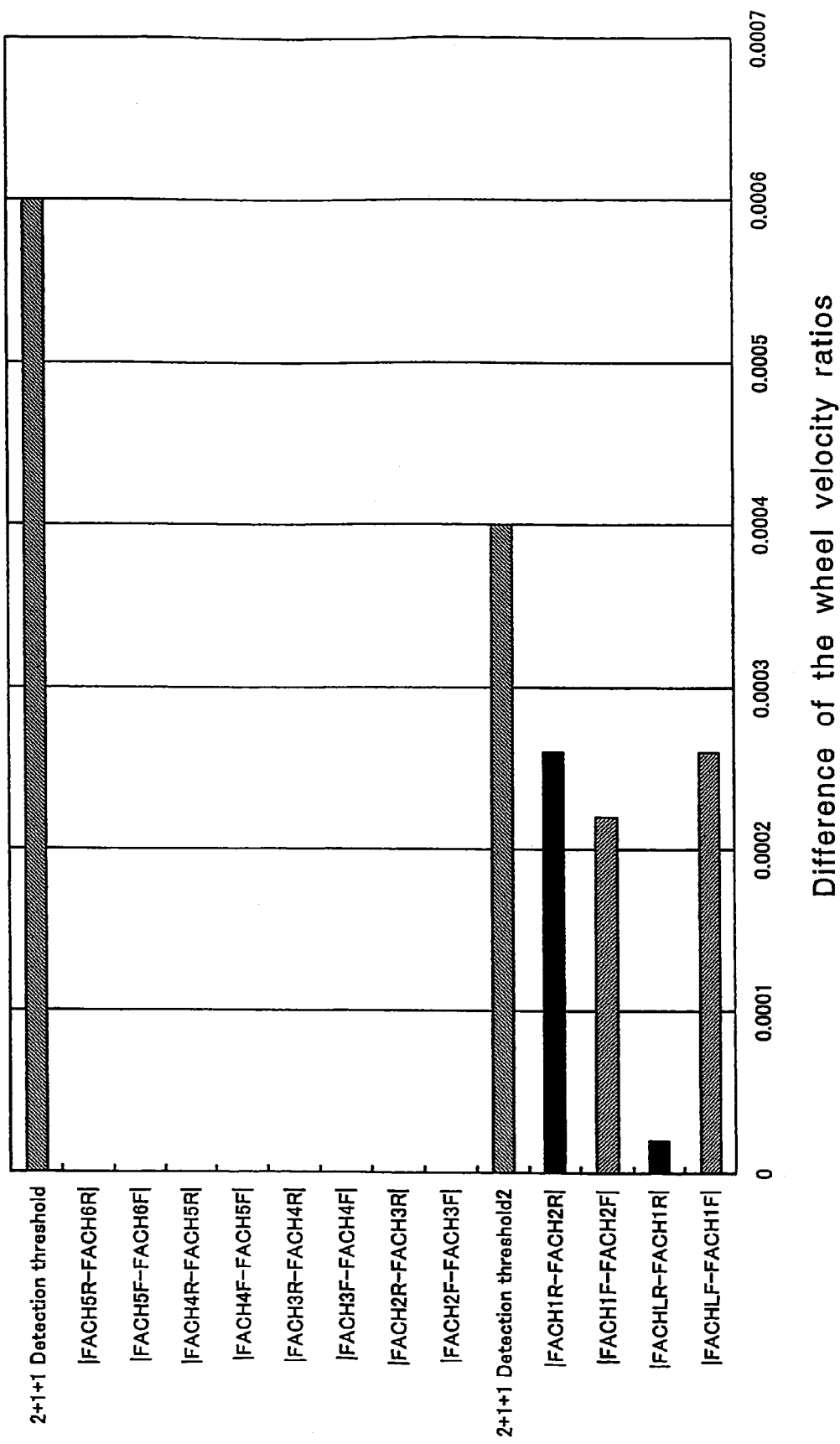
FIG. 4 is a graph showing the comparison between the right and left wheel velocity ratios in the case of setting the same kind of tires in an example of the present invention.
Figure 5:
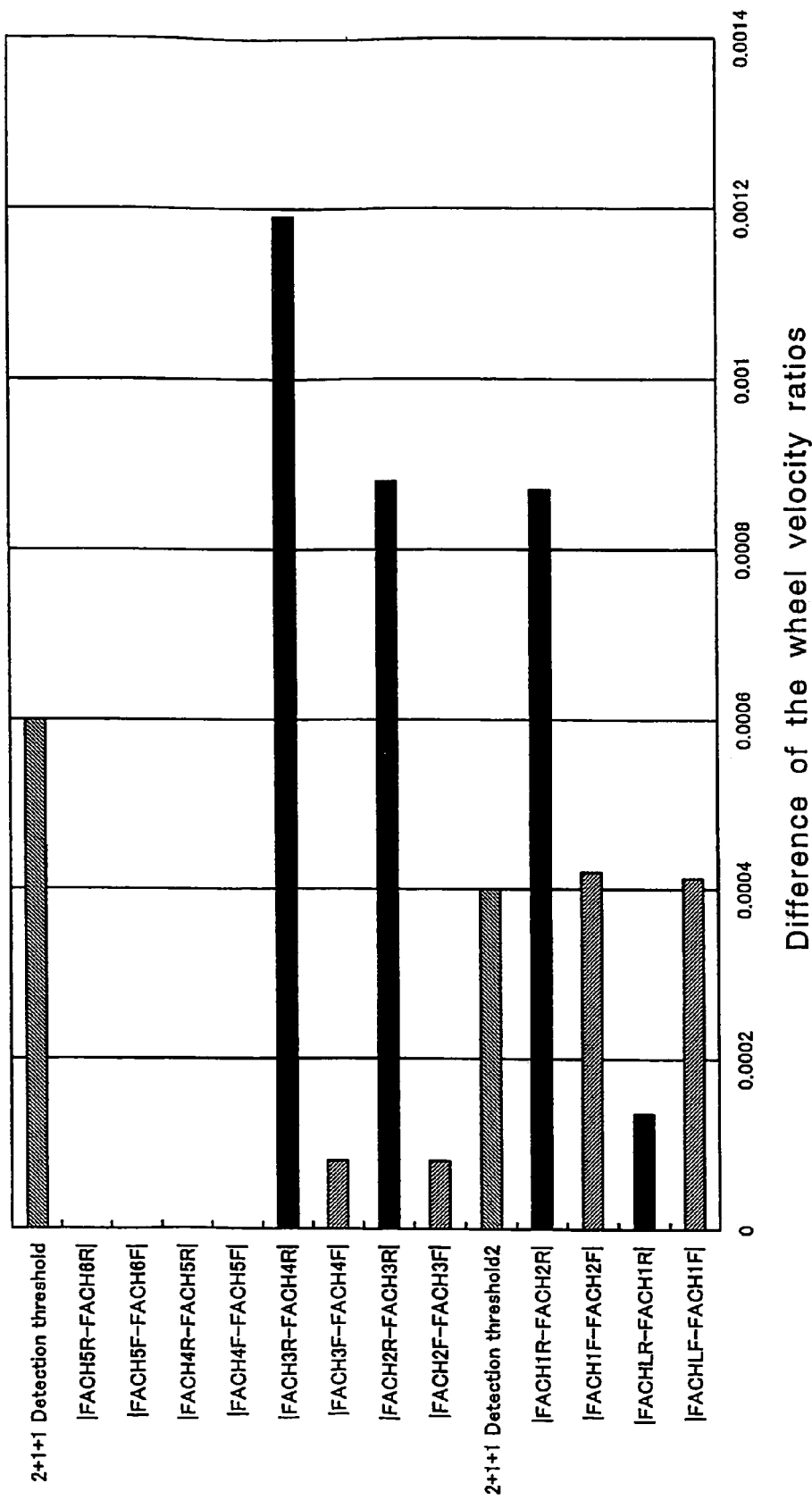
FIG. 5 is a graph showing the comparison between the right and left wheel velocity ratios in the case of setting the heterogeneous tires in an example of the present invention.

FIG. 4 shows the running data in the case where the same kind of tires (summer tire) were set, and FIG. 5 shows the running data in the case where the heterogeneous tires were set.

In the present example, the velocity regions are classified into 6 steps, and the threshold values are set to two kinds of the case of comparison between the velocity region 2 and the velocity regions larger than 2 (2+1+1 Detection threshold) and the case of comparison between the regions up to the velocity region 2 (2+1+1 Detection threshold). The threshold value for the comparison of the velocity regions larger than 2 is 0.0006, and the threshold value for the comparison of the velocity regions smaller than 2 is 0.0004. In FIG. 4 and FIG. 5, FACHLF and FACHLR show the wheel velocity ratio of right and left front wheels and the wheel velocity ratio of right and left rear wheels in the case of the vehicle velocity being 0, and their values are 1.

As will be seen from FIGS. 4 and 5, when the same kind of tires are set (FIG. 4), there is no case to exceed the threshold value, but when the heterogeneous tires are set (FIG. 5), there are cases to exceed the threshold value [c.f. comparison between right and left rear wheels in velocity regions 3 and 4, comparison between right and left rear wheels in velocity regions 1 and 2, comparison between right and left front wheels in velocity regions L (velocity=0) and 1].

As a result, it has been possible to set the threshold value for judging the loss of pneumatic pressure of tire to the threshold value for the case of the heterogeneous tire being set. At the same time, it has become possible to inform the driver of the fact that the heterogeneous tire has been set.

What is claimed is:

1. A method for detecting whether kinds of tires provided on a vehicle are different or not based on a rotational velocity of wheels set on said vehicle, said method comprising steps of:

calculating velocity ratios of right and left front wheels or velocity ratios of right and left rear wheels at each of velocity regions, when pneumatic pressures of said tires provided on said vehicles are normal;

comparing using a computer processor for said velocity ratio of said right front wheel with said velocity ratio of said left front wheel at each of said velocity regions, or comparing said velocity ratio of said right rear wheel with said velocity ratio of said velocity ratio of said left rear wheel at each of said velocity regions; and detecting a heterogeneity between said tires provided on said right front wheel and said left front wheel, or a heterogeneity between said tires provided on said right rear wheel and said left rear wheel.

2. A device for detecting whether kinds of tires provided on a vehicle are different or not based on a rotational velocity of wheels set on said vehicle, said device comprising:

a wheel velocity calculating means for calculating each rotational velocity of a right front wheel and a left front wheel as well as a right rear wheel and a left rear wheel which are set on a vehicle at each of velocity regions, when pneumatic pressures of said tires provided on said vehicles are normal;

a wheel velocity ratio comparison means for comparing velocity ratios between the rotational velocities of said right front wheel and said left front wheel which are calculated at each of said velocity regions, or velocity ratios between the rotational velocities of said right rear wheel and said left rear wheel which are calculated at each of said velocity regions; and a detection means for detecting a heterogeneity between said tires provided on said right front wheel and said left front wheel, or a heterogeneity between said tires provided on said right rear wheel and said left rear wheel based on as a result of comparing the velocity ratios between the rotational velocities of said right front wheel and said left front wheel, or the velocity ratios between the rotational velocities of said right rear wheel and said left rear wheel.

3. A method for detecting a loss of pneumatic pressures of tires comprising a step of modifying a threshold value for deciding the loss of pneumatic pressure of the tires as a result of the step of detecting a heterogeneity between said tires provided on said right front wheel and said left front wheel, or a heterogeneity between said tires provided on said right rear wheel and said left rear wheel by the method as defined in claim 1.

4. A device for detecting a loss of pneumatic pressures of tires comprising a means for modifying a threshold value for deciding the loss of pneumatic pressure of the tires as a result of a detection means for detecting a heterogeneity between said tires provided on said right front wheel and said left front wheel, or a heterogeneity between said tires provided on said right rear wheel and said left rear wheel by the device as defined in claim 2.

5. A program stored on computer-readable media for implementing a computer as a means for detecting whether kinds tires provided on a vehicle are different or not based on a rotational velocity of wheels set on said vehicle, said means comprising:

a wheel velocity calculating means for calculating each rotational velocity of a right front wheel and a left front wheel as well as a right rear wheel and a left rear wheel which are set on a vehicle at each of velocity regions, when pneumatic pressures of said tires provided on said vehicles are normal;

a wheel velocity ratio comparison means for comparing velocity ratios between the rotational velocities of said right front wheel and said left front wheel which are calculated at each of said velocity regions, or velocity ratios between the rotational velocities of said right rear wheel and said left rear wheel which are calculated at each of said velocity regions; and a detection means for detecting a heterogeneity between said tires provided on said right front wheel and said left front wheel, or a heterogeneity between said tires provided on said right rear wheel and said left rear wheel based on as a result of comparing the velocity ratios between the rotational velocities of said right front wheel and said left front wheel, or the velocity ratios between the rotational velocities of said right rear wheel and said left rear wheel.

\* \* \* \* \*